T. Welham,
Water Wheel,
No. 68,325. Patented Aug. 27, 1867.

Witnesses
William Graf
J Franklin Reigart

Inventor
Thos Welham

United States Patent Office.

THOMAS WELHAM, OF PHILADELPHIA, PENNSYLVANIA.

Letters Patent No. 68,325, dated August 27, 1867.

IMPROVEMENT IN WATER-WHEELS.

The Schedule referred to in these Letters Patent and making part of the same.

TO ALL WHOM IT MAY CONCERN:

Be it known that I, THOMAS WELHAM, of the city of Philadelphia, State of Pennsylvania, have invented a new and useful Friction Water-Wheel; and I do hereby declare the following to be an exact description thereof, reference being had to the accompanying drawings, and to the letters of reference marked thereon, making a part of this specification, in which—

Figure 1:
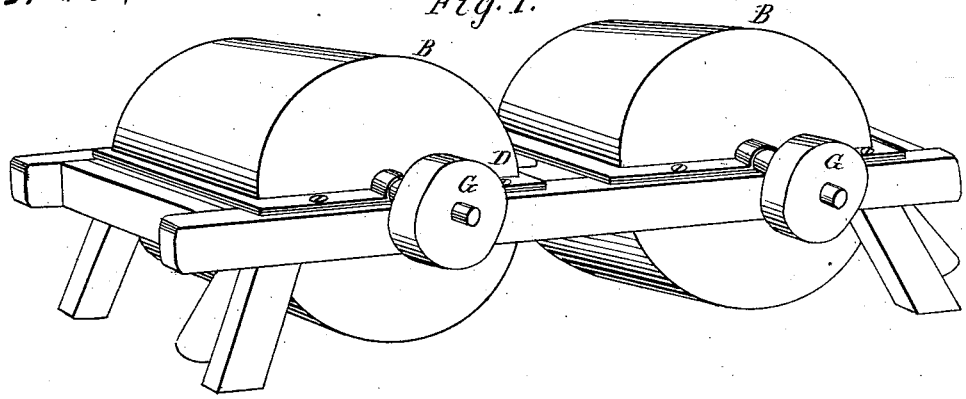

Figure 1 represents a perspective view of two wheels enclosed.

Figure 2:
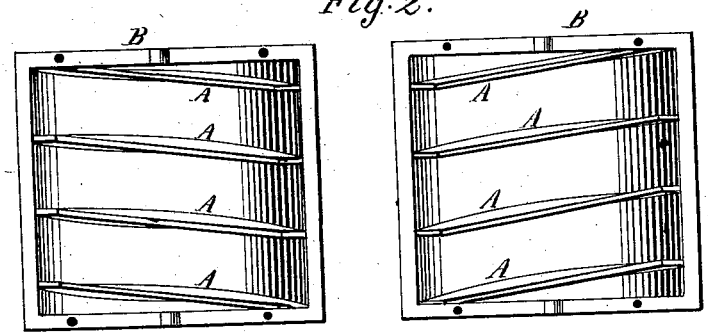

Figure 2, a view of the spiral flanges attached to the inside of the casing or concave.

Figure 3:
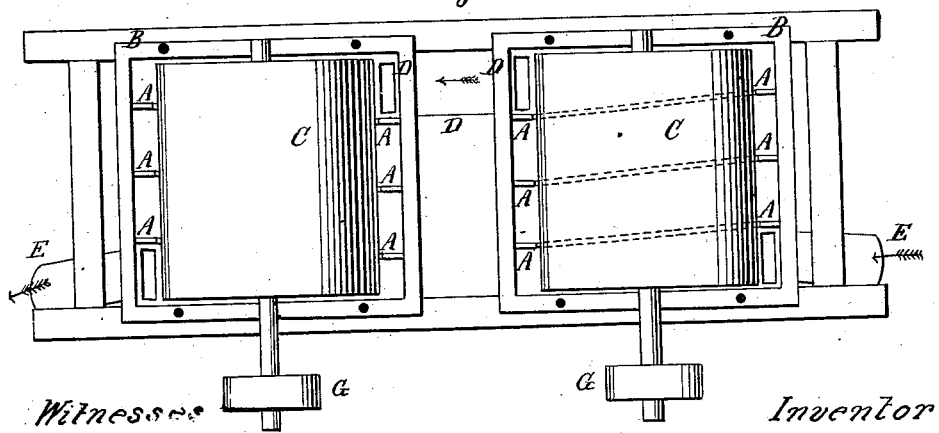

Figure 3, a sectional view of the two wheels, as enclosed in the concave and spiral flanges.

The nature of my invention consists in the construction of a friction water-wheel, enclosed in a concave, with spiral flanges attached to the concave. The object is to drive the wheel by the friction of the water, so that any number of wheels can be driven by the same water, and one or more wheels can at any time be stopped without stopping or retarding the operation or speed of any of the other wheels; and for this purpose I make flanges A A in a spiral form attached permanently to the inside of the concave casing or water-tight cylinders B B; the wheels C having a smooth periphery, or, if necessary, very short buckets or grooves on the periphery of each wheel, and the wheels C C operating in the centre of the flanges A, so that the water is conducted around and forced over each wheel between the flanges A of the casing B, operating a series of wheels, and conducted from cylinder to cylinder through the connecting-tube or channel D. E E are the feed and discharge pipes, as indicated by the arrows, and G G the driving pulleys for transmitting power. H represents any kind of a frame to suit the location.

What I claim as my invention, and desire to secure by Letters Patent, is—

The friction water-wheel C, constructed as shown, and enclosed in a case, as herein described.

I also claim the flanges A of the water-tight casing B, said flanges forming a passage entirely around the circumference of the wheel C, as herein shown and described.

THOS. WELHAM.

Witnesses:
EDM. F. BROWN,
J. FRANKLIN REIGART.